(12) United States Patent
Hemphill et al.

(10) Patent No.: US 7,699,554 B2
(45) Date of Patent: Apr. 20, 2010

(54) REMOVABLE SEAL CARRIER FOR BLOWOUT PREVENTER BONNET ASSEMBLY

(75) Inventors: Edward R. Hemphill, Houston, TX (US); William R. Holland, Houston, TX (US); Michael W. Berckenhoff, Spring, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 1325 days.

(21) Appl. No.: 10/453,885

(22) Filed: Jun. 3, 2003

(65) Prior Publication Data

US 2004/0258470 A1    Dec. 23, 2004

(51) Int. Cl.
*E21B 33/06* (2006.01)
*E21B 19/10* (2006.01)

(52) U.S. Cl. .................. 403/319; 403/361; 251/1.3; 277/324; 277/910

(58) Field of Classification Search .................. 403/13, 403/14, 150, 156, 316, 319, 361; 251/1.3; 277/324, 529, 584, 910
See application file for complete search history.

(56) References Cited

U.S. PATENT DOCUMENTS

| | | | | |
|---|---|---|---|---|
| 1,467,273 A | * | 9/1923 | Jaques | 403/165 |
| 1,659,576 A | * | 2/1928 | Brady et al. | 403/373 |
| 1,764,263 A | * | 6/1930 | Johnson | 403/165 |
| 2,650,103 A | * | 8/1953 | Oehler | 403/165 |
| 2,752,119 A | | 6/1956 | Allen et al. | 251/1 |
| 2,912,214 A | | 11/1959 | Allen et al. | 251/1 |
| 3,156,475 A | | 11/1964 | Gerard et al. | 277/58 |
| 3,272,222 A | | 9/1966 | Allen | 137/315 |
| 3,589,667 A | | 6/1971 | Lewis et al. | 251/1 |
| 3,658,287 A | | 4/1972 | Lerouax | 251/1 |
| 4,186,760 A | * | 2/1980 | Hastings | 403/315 |
| 4,240,503 A | | 12/1980 | Holt, Jr. et al. | 166/55 |
| 4,253,638 A | | 3/1981 | Troxell, Jr. | 251/1 A |
| 4,290,577 A | * | 9/1981 | Olson | 251/1.3 |
| 4,504,037 A | | 3/1985 | Beam et al. | 251/1 A |
| 4,558,842 A | | 12/1985 | Peil et al. | 251/1.3 |
| 4,566,372 A | | 1/1986 | Zandel et al. | 92/168 |
| 4,610,564 A | * | 9/1986 | Vantouroux | 403/316 |
| 4,628,758 A | * | 12/1986 | Yuzuriha et al. | 403/14 |

(Continued)

OTHER PUBLICATIONS

Supplementary European Search Report issued in corresponding EPO Application No. 04753875.6-1266 (PCT/US2004017146); Dated Feb. 7, 2007; 3 pages.

(Continued)

*Primary Examiner*—Daniel P Stodola
*Assistant Examiner*—Ernesto Garcia
(74) *Attorney, Agent, or Firm*—Potomac Patent Group PLLC (57) ABSTRACT

A bonnet assembly for a blowout preventer uses a seal carrier that is removable so as to allow for efficient and easy seal replacement. The seal carrier has: a recess adapted to at least partially embed a seal for sealing the bonnet assembly to a body of the blowout preventer; and a first connecting rod coupled to and extending from an inner surface of the seal carrier, where the first connecting rod has a fastening structure proximal to a distal end of the first connecting rod, where the fastening structure is adapted to engage with a first fastening device, and where the seal carrier is removable from the bonnet assembly when the first fastening device is disengaged from the fastening structure.

7 Claims, 7 Drawing Sheets

U.S. PATENT DOCUMENTS

| | | | | |
|---|---|---|---|---|
| 4,634,309 | A * | 1/1987 | Dewey | 403/319 |
| 4,787,654 | A | 11/1988 | Zeitlin | 285/101 |
| 4,976,402 | A | 12/1990 | Davis | 251/1.3 |
| 5,009,289 | A * | 4/1991 | Nance | 251/1.3 |
| 5,018,901 | A * | 5/1991 | Ferree et al. | 403/316 |
| 5,025,708 | A | 6/1991 | Smith et al. | 92/19 |
| 5,074,702 | A * | 12/1991 | Wiegand | 403/316 |
| 5,251,870 | A * | 10/1993 | Ward | 251/1.3 |
| 5,255,890 | A | 10/1993 | Morrill | 251/1.3 |
| 5,400,857 | A | 3/1995 | Whitby et al. | 166/297 |
| 5,575,452 | A | 11/1996 | Whitby et al. | 251/1.3 |
| 5,603,481 | A * | 2/1997 | Parker et al. | 251/1.3 |
| 5,645,098 | A | 7/1997 | Morrill | 137/15 |
| 5,655,745 | A | 8/1997 | Morrill | 251/1.3 |
| 5,816,732 | A * | 10/1998 | Nissen | 403/165 |
| 5,848,815 | A * | 12/1998 | Tsui et al. | 403/164 |
| 5,897,094 | A | 4/1999 | Brugman et al. | 251/1.3 |
| 5,975,484 | A | 11/1999 | Brugman et al. | 251/1.3 |
| RE37,538 | E | 2/2002 | Morrill | |
| 6,510,897 | B2 | 1/2003 | Hemphill | 166/373 |
| 6,554,247 | B2 | 4/2003 | Berckenhoff et al. | 251/1.3 |
| 6,652,012 | B1 * | 11/2003 | Fuller et al. | 411/400 |
| 6,719,262 | B2 * | 4/2004 | Whitby et al. | 251/1.3 |
| 2002/0162981 | A1 | 11/2002 | Berckenhoff et al. | |

OTHER PUBLICATIONS

European Office Action issued in corresponding EP Application No. 04753875.6-1266 dated May 16, 2007 (5 pages).

* cited by examiner

REMOVABLE SEAL CARRIER FOR BLOWOUT PREVENTER BONNET ASSEMBLY

BACKGROUND OF THE INVENTION

1. Field of the Invention

The present invention relates generally to blowout preventers used in the oil and gas industry. More particularly, the present invention relates to a removable seal carrier for a blowout preventer bonnet assembly.

2. Background Art

Well control is an important aspect of oil and gas exploration. When drilling a well in, for example, oil and gas exploration applications, devices must be put in place to prevent injury to personnel and equipment associated with drilling activities. One such well control device is known as a blowout preventer (BOP).

Blowout preventers are generally used to seal a wellbore. For example, drilling wells in oil or gas exploration involves penetrating a variety of subsurface geologic structures, or "layers." Generally, each layer is of a specific geologic composition such as, for example, shale, sandstone, limestone, etc. Each layer may contain trapped fluids or gas at different formation pressures, and the formation pressures increase with increasing depth. The pressure in the wellbore is generally adjusted to at least balance the formation pressure by, for example, increasing a density of drilling mud in the wellbore or increasing pump pressure at the surface of the well.

There are occasions during drilling operations when a wellbore may penetrate a layer having a formation pressure substantially higher than the pressure maintained in the wellbore. When this occurs, the well is said to have "taken a kick." The pressure increase associated with this "kick" is generally produced by an influx of formation fluids (which may be a liquid, a gas, or a combination thereof) into the wellbore. The relatively high pressure "kick" tends to propagate from a point of entry in the wellbore uphole (from a high pressure region to a low pressure region). If the "kick" is allowed to reach the surface, drilling fluid, well tools, and other drilling structures may be blown out of the wellbore. These blowouts often result in catastrophic destruction of the drilling equipment (including, for example, the drilling rig) and in substantial injury or death to rig personnel.

Because of the risk of such blowouts, blowout preventers are typically installed at the surface or on the sea floor in deep water drilling water arrangements so that "kicks" may be adequately controlled and circulated out of the system. Blowout preventers may be activated to effectively seal in a wellbore until active measure can be taken to control a "kick." There are several types of blowout preventers, the most common of which are annular blowout preventers and ram-type blowout preventers.

Annular blowout preventers typically use annular elastomer "packers" that may be activated by, for example, inflation, to encapsulate drillpipe and well tools and completely seal the wellbore. The second type of common blowout preventer is the ram-type blowout preventer. Ram-type blowout preventers typically are formed by a body and at least two bonnet assemblies disposed on the body and opposite of each other with respect to a circumference or perimeter of the body.

Figure 1:
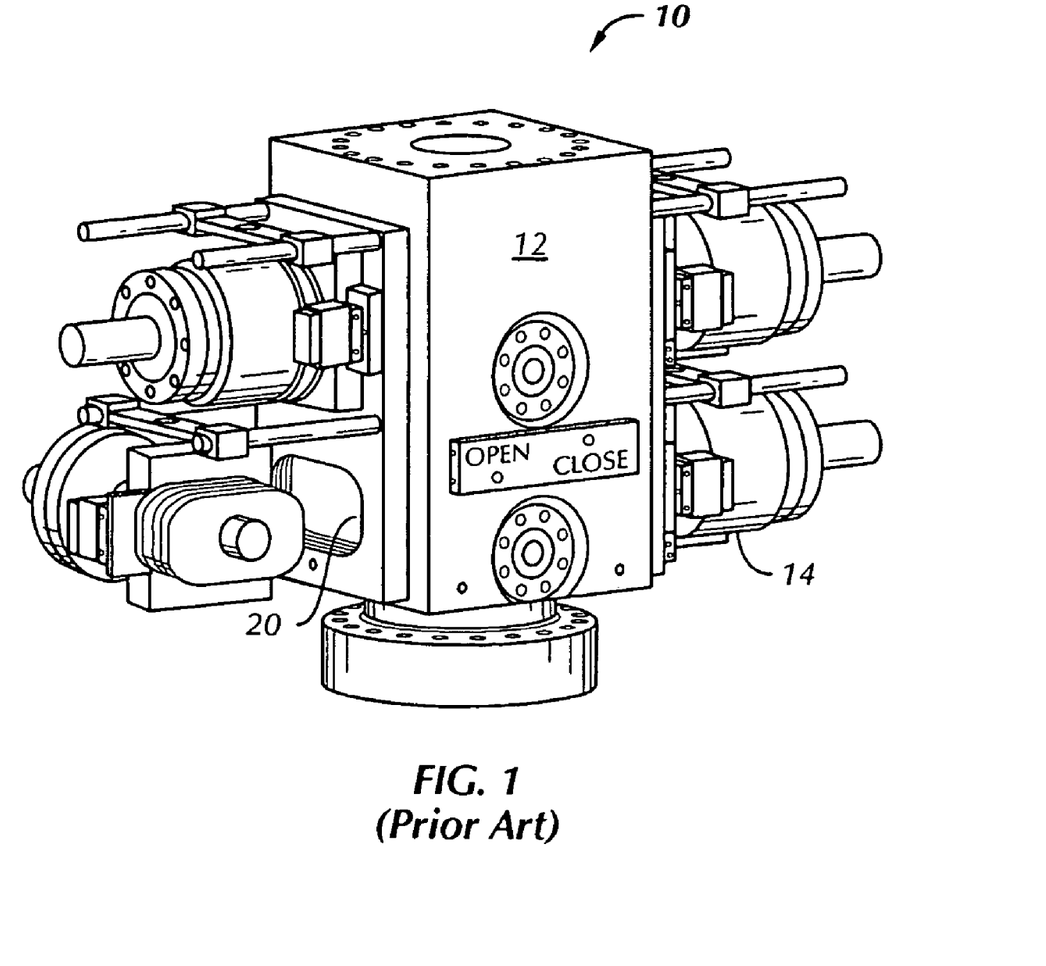
FIG. 1 shows a prior art blowout preventer.

FIG. 1 shows an example of a ram-type blowout preventer 10. The blowout preventer 10 is formed by a body 12 and oppositely disposed bonnet assemblies 14. The blowout preventer 10 further includes a plurality of side openings 20 that are each adapted to be coupled to a bonnet assembly 14.

FIG. 1 shows a bonnet assembly 14 that may be secured to the body 12 using a radial lock mechanism to allow for maintenance access. A radial lock mechanism for blowout preventers is disclosed in U.S. Pat. No. 6,554,247, which is assigned to the assignee of the present invention and is incorporated herein by reference in its entirety. FIG. 1 also shows bonnet assemblies 14 that are coupled to the blowout preventer body 12 by a slidable coupling. A slidable coupling is disclosed in U.S. Pat. No. 6,510,897, which is assigned to the assignee of the present invention and is incorporated herein by reference in its entirety. Alternatively, in other typical blowout preventer designs, bonnet assemblies are generally secured to a body of the blowout preventer about the circumference of the body with, for example, bolts.

Inside of a bonnet assembly is a piston actuated ram. The rams may either be pipe rams, which, when activated, move to engage and surround drillpipe and well tools to seal the wellbore, or shear rams, which, when activated, move to engage and physically shear any drillpipe or well tools in the wellbore. The rams, whether pipe-type or shear-type, are typically located opposite of each other and typically seal against one another proximate a center of the wellbore in order to completely seal the wellbore.

Figure 2:
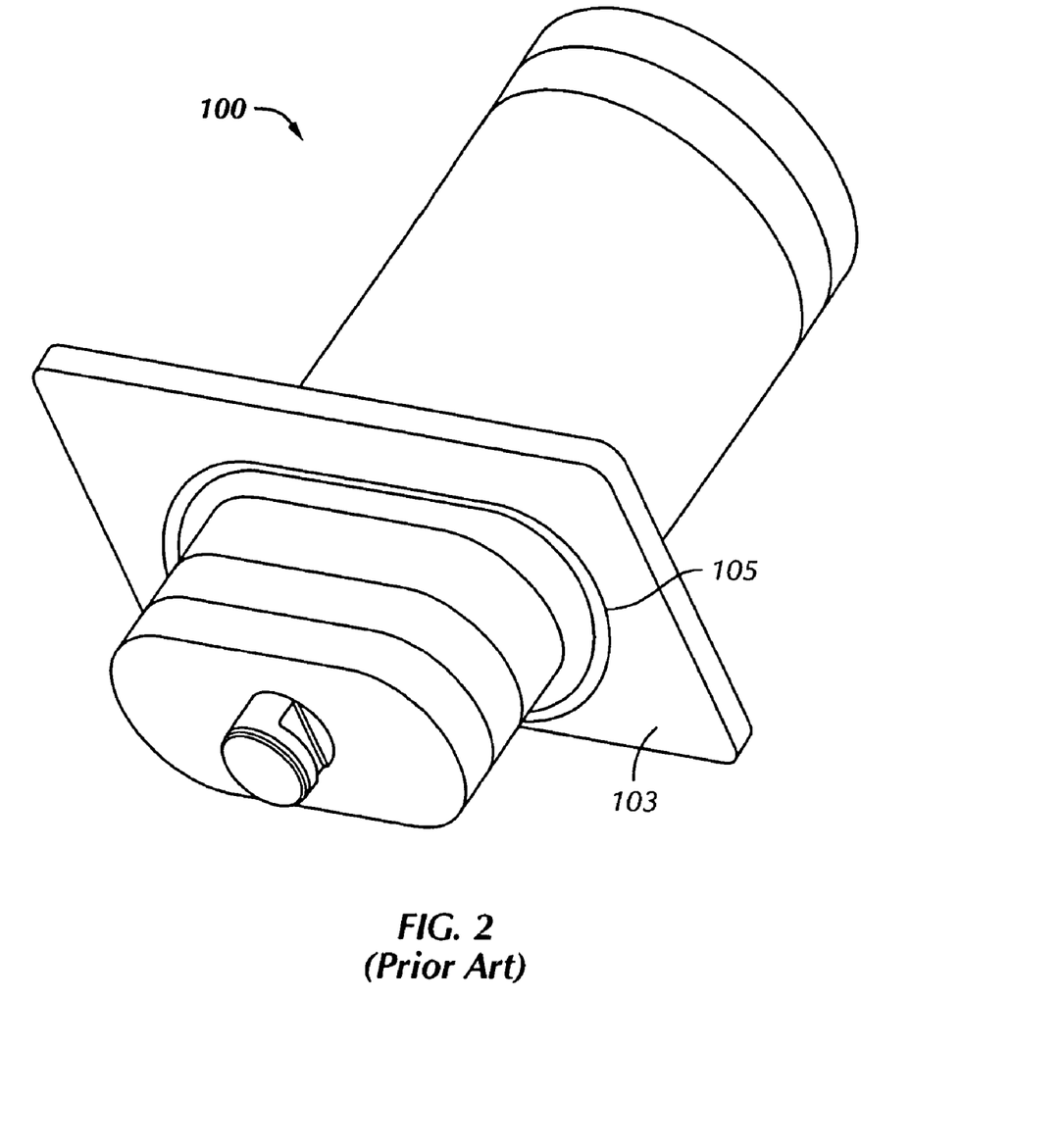
FIG. 2 shows a prior art blowout preventer bonnet assembly.

As with any tool used in drilling oil and gas wells, blowout preventers must be regularly maintained. For example, a blowout preventer uses high pressure seals between bonnet assemblies and the body of the blowout preventer. FIG. 2 shows a prior art bonnet assembly 100. The bonnet assembly 100 includes a face 103 that is engaged with a corresponding face of a blowout preventer body (e.g., 12 in FIG. 1) when the bonnet assembly 100 is installed on the blowout preventer. The bonnet face 103 includes a face seal 105 that seals the high pressure inside the blowout preventer body (e.g., 12 in FIG. 1) and the bonnet assembly 100.

The high pressure seals in many instances are elastomer seals. The elastomer seals must be regularly checked to ensure that the elastomer has not been cut, permanently deformed, or deteriorated by, for example, chemical reaction with the drilling fluid in the wellbore. Moreover, it is often desirable to replace seals to ensure that the bonnet will be properly sealed in the event of a kick. Therefore, it is important that the blowout prevent bonnet include components that are easily removable so that seals may be easily accessed, checked, maintained, and replaced.

SUMMARY OF INVENTION

According to one aspect of one or more embodiments of the present invention, a seal carrier for a bonnet assembly of a blowout preventer comprises: a first recess adapted to at least partially embed a seal for sealing the bonnet assembly to a body of the blowout preventer; and a first connecting rod coupled to and extending from an inner surface of the seal carrier, where the first connecting rod has a fastening structure proximal to a distal end of the first connecting rod, where the fastening structure is adapted to engage with a first fastening device, and where the seal carrier is removable from the bonnet assembly when the first fastening device is disengaged from the fastening structure.

According to one aspect of one or more embodiments of the present invention, a seal carrier for a bonnet assembly of a blowout preventer comprises a first seal plate and a second seal plate. The first seal plate has: a first recess adapted to at least partially embed a seal for sealing the bonnet assembly to a body of the blowout preventer; and a first connecting rod coupled to and extending from an inner surface of the seal carrier, where the first connecting rod has a fastening structure proximal to a distal end of the first connecting rod, where the fastening structure is adapted to engage with a first fastening device, and where the first seal plate is removable from the bonnet assembly when the first fastening device is disengaged from the fastening structure. The second seal plate has: a second recess adapted to at least partially embed a second seal for sealing the bonnet assembly to the body of the blowout preventer; and a seal plate coupling means for coupling the second seal plate to the first seal plate.

Other aspects and advantages of the invention will be apparent from the following description and the appended claims.

DETAILED DESCRIPTION

Embodiments of the present invention relate to a blowout preventer having a bonnet assembly with a removable seal carrier (also referred to as "removable seal plate"). Seals for sealing the bonnet assembly to a body of the blowout preventer are mounted on the removable seal carrier, where the removable seal carrier is connected to a load block (or mating portion) of the bonnet assembly with a connector that is securable by a fastening device inserted into the load block (or mating portion) and through an aperture in the connector.

The use of a removable seal carrier as shown and discussed in the embodiments of the present invention below aids drilling personnel to maintain a blowout preventer by allowing them to replace, in addition to other blowout preventer components, consumable seals that seal a bonnet assembly to a body of the blowout preventer with minimal time, effort, and resources.

Figure 3:
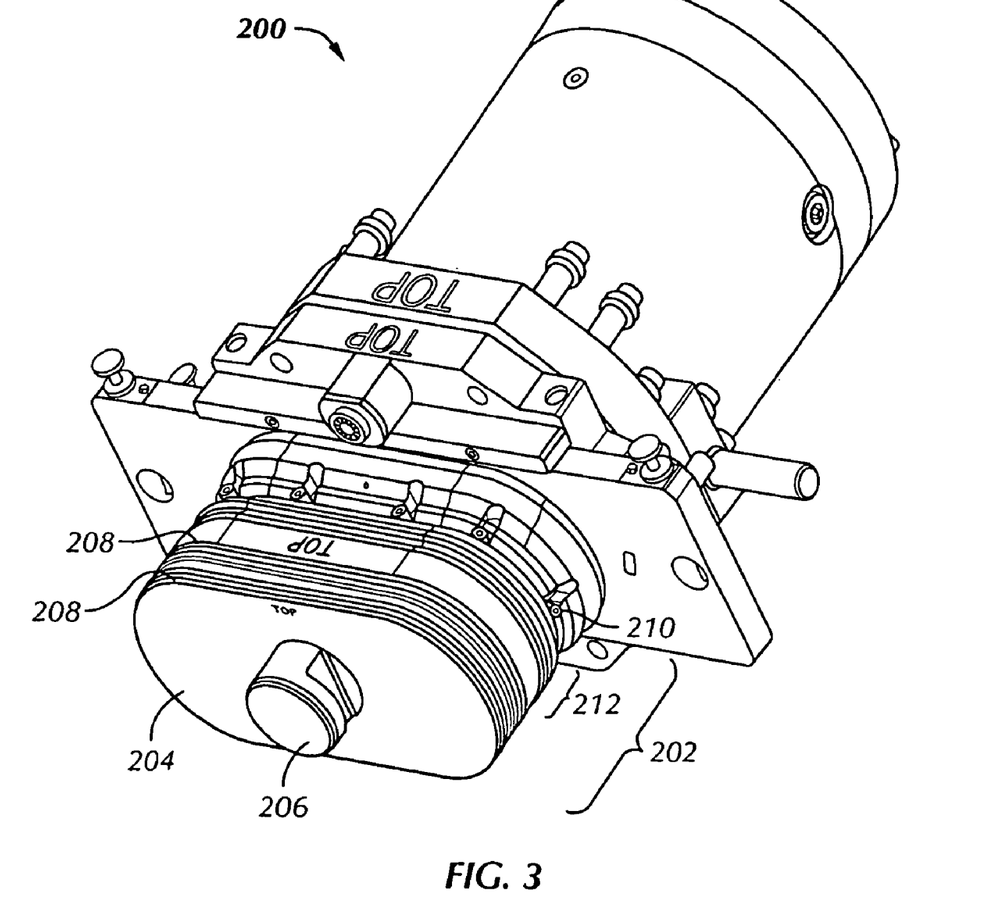
FIG. 3 shows a blowout preventer bonnet assembly in accordance with an embodiment of the present invention.

FIG. 3 shows an exemplary seal carrier 204 for a blowout preventer bonnet assembly 200 in accordance with an embodiment of the present invention. The seal carrier is disposed on a proximal end of a ram block attachment portion 202 of the bonnet assembly 200. About the perimeter of the removable seal carrier 204 are mounted seals 208 for effectively sealing the bonnet assembly 200 to a side opening (not shown) of a body (not shown) of the blowout preventer. Those skilled in the art will appreciate that the removable seal carrier 204 may be used to mount any number and type of seals 208.

In an inner perimeter (not shown) of the removable seal carrier 204 are located seals (not shown) for sealing against a ram block actuator piston 206. These seals will be described in more detail below with respect to FIG. 4.

As will be described further below, the removable seal carrier 204 is secured to the remaining portion of the bonnet assembly 200 with fastening devices 210 that extend into a load block portion 212 of the ram block attachment portion 202 of the bonnet assembly 200.

Figure 4:
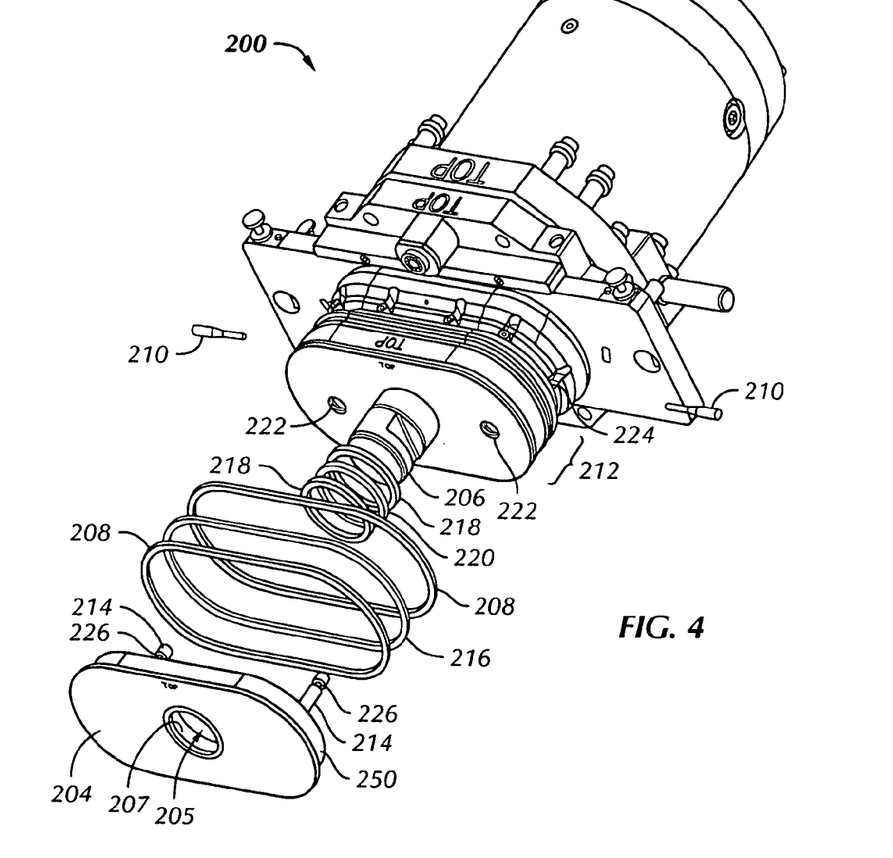
FIG. 4 shows an exploded view of the blowout preventer bonnet assembly shown in FIG. 3.

FIG. 4 shows an exploded view of the removable seal carrier 204 shown in FIG. 3. The removable seal carrier 204 includes a connecting means 214 for connecting the removable seal carrier 204 to the load block portion 212 of the bonnet assembly 200. The connecting means 214 extend from an inner surface of the seal carrier 204. In one embodiment of the present invention, the connecting means 214 are connecting rods. Moreover, as shown in FIG. 4, the connecting means 214 may protrude from and be permanently affixed to the removable seal carrier 204. However, in one or more other embodiments of the present invention, the connecting means 214 may not be permanently affixed to the removable seal carrier 204.

In some embodiments, such as the one shown in FIG. 4, the fastening devices 210 are locking pins that are inserted into the load block 212 and engage with the connection means 214. This engagement between the fastening devices 210 and the connecting means 214 is further described below with reference to FIGS. 6-8.

The removable seal carrier 204 is adapted so as to allow seals 208 to be positioned around a recess 250 of the removable seal carrier 204. Moreover, in one or more embodiments of the present invention, a seal spacer 216 may be positioned in between seals 208.

As shown in FIG. 4, the seal carrier 204 also includes a center opening 205 to enable the ram block actuator piston 206 to move in and out of the bonnet assembly 200. The center opening 205 includes an inner perimeter 207, on which inner seals 218 and an optional seal spacer 220 are be positioned. The inner seals 218 seal the outer surface of a portion of the ram block actuator piston 206 against the high pressure of a kick.

As shown in FIG. 4, the load block portion 212 of the bonnet assembly 200 may be provided with apertures 222 adapted to receive and at least partially house the connecting means 214. Moreover, the load block portion 212 is provided with apertures 224 adapted to receive and at least partially house fastening devices 210.

Although not shown in FIG. 4 (but discussed below with reference to FIGS. 5-8), when the removable seal carrier 204 is fastened and secured to the bonnet assembly 200, the fastening devices 210 extend into the load block portion 212 and engage with a locking (or "fastening") structure 226 provided in the connecting means 214. In the embodiment shown, the locking structure 226 comprises a conferential groove near the distal end of the connecting means 226. When the fastening devices 210 are in an unfastened positioned, or otherwise disengaged from the load block portion 212 of the bonnet assembly 200, the connecting means 214 affixed to the removable seal carrier 204 may be slid out from the apertures 222, thereby allowing for the removal of the removable seal carrier 204 from the bonnet assembly 200.

A removable seal carrier 204 in accordance with one or more embodiments of the present invention can be easily removed from the bonnet 200 for maintenance and replacement. Removal of the fastening devices 210 will uncouple the connection means 214 from the bonnet 200, and the seal carrier 204 can then be removed for maintenance.

Further, in one or more embodiments of the present invention, the removable seal carrier 204 may be implemented with a flat plate with machined recesses for mounting the seals 208. In such embodiments, the connecting means 214 may be integral with the plate and extend from a flat surface of the flat plate. The flat plate mates against a flat surface of the load block portion 212 such that fastening devices 210 may extend into the load block portion 212 and through apertures 226 in connecting means 214 that are inserted into the load block portion 212.

Figure 5:
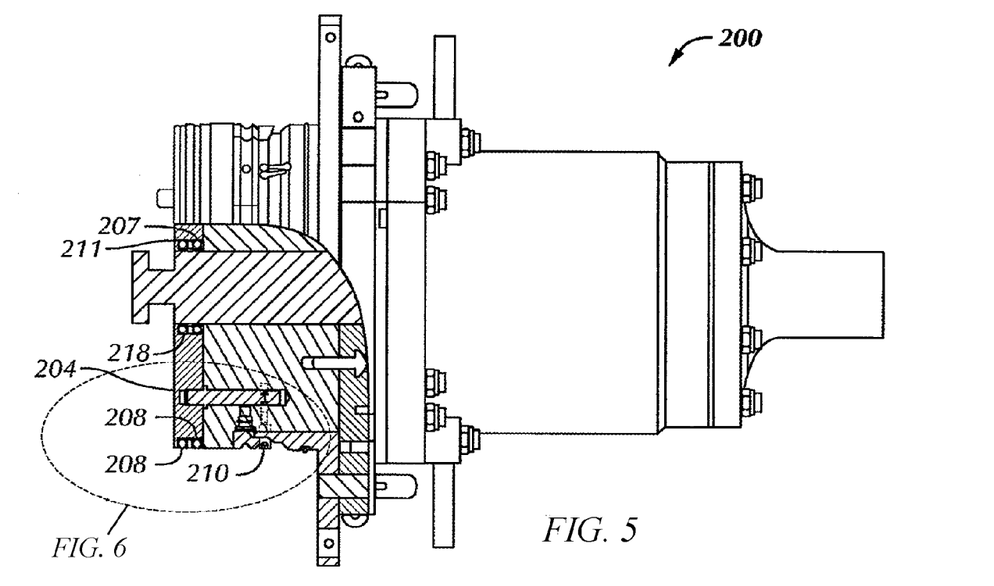
FIG. 5 shows a cut-away top view of a blowout preventer bonnet assembly in accordance with an embodiment of the present invention.

FIG. 5 shows a top view of a cut-away of an exemplary removable seal carrier 204 in accordance with an embodiment of the present invention. Inner seals 218 are shown positioned in recessed surface 207 of the seal carrier 204 and axially held in place between a lip 211 of the seal carrier 204 and the bonnet 201. The inner seals 218 seal the ram block actuator piston 206 against the high pressure experienced during a kick.

Figure 6:
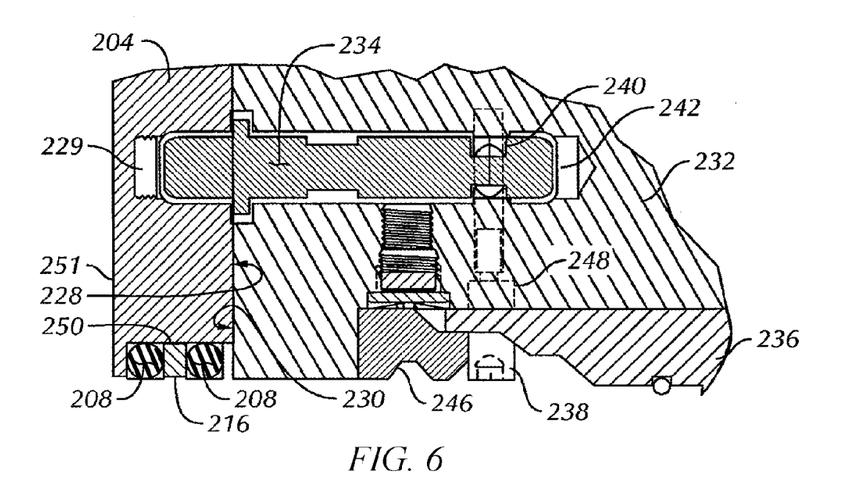
FIG. 6 shows a cross-sectional blowup view of a portion of the cut-away top view shown in FIG. 5.

FIG. 6 shows a cross-sectional blowup view of a portion of the top view cut-away shown in FIG. 5. The removable seal carrier 204 has a recess 250 for the positioning of seals 208 and a seal spacer 216. The seals 208 and seal spacer 216 are axially retained in place between a lip 251 of the seal carrier 204 and a mating surface 230 on the load block 232 of the bonnet assembly (201 in FIG. 5).

The seal carrier 204 also includes a flat surface 228 that is mated against a mating surface 230 of a load block 232 (e.g., load block portion 212 shown in FIG. 4). The connecting means comprises at least one connecting rod 234 that is used to secure an engagement between the mating surfaces 228, 230. As shown in FIG. 6, a longitudinal axis of the connecting rod 234 is substantially perpendicular to a plane of flat surface 228 and flat surface 230.

In some embodiments, the seal carrier 204 includes a female threaded connector 229 so that the connecting rod 234, which may include a male threaded connector id, may be threadingly engaged with the seal carrier 204. Other methods of coupling a connecting rod 234 to a seal carrier 204 (e.g., welding) may be used without departing from the scope of the invention. Those having ordinary skill in the art will be able to devise other methods for coupling a connecting rod to a seal carrier.

The connecting rod 234 is provided with an groove 240 adapted to engage with a fastening device. In FIG. 6, the fastening device comprises at least one locking pin 238. When the seal carrier 204 is connected to the bonnet (201 in FIG. 5), the portion of the connecting rod 234 provided with groove 240 is positioned inside the load block 232 of the bonnet (201 in FIG. 5) such that the locking pin 238 may extend into the load block 232 and engage with groove 240 of the connecting rod 234.

As shown in FIG. 6, the aperture 242 adapted to receive and at least partially house the connecting rod 234 intersects an aperture 248 adapted to receive and at least partially house the locking pin 238. More particularly, a longitudinal axis of aperture 242 is substantially perpendicular to a longitudinal axis of aperture 248.

Moreover, as shown in FIG. 6, in one or more embodiments of the present invention, the seal carrier 204 may be used with a bonnet (201 in FIG. 5) that includes a radial lock 246 and a radial lock displacement device 236. This type of bonnet locking mechanism is described in U.S. Pat. No. 6,554,247, which is assigned to the assignee of the present invention and has been incorporated by reference herein. In such embodiments, the locking pin 238 extends through a portion of the radial lock displacement device 236 into the load block 232 of the bonnet (201 in FIG. 5) and the aperture 242 and through the groove 240 in the connecting rod 234.

Figure 7:
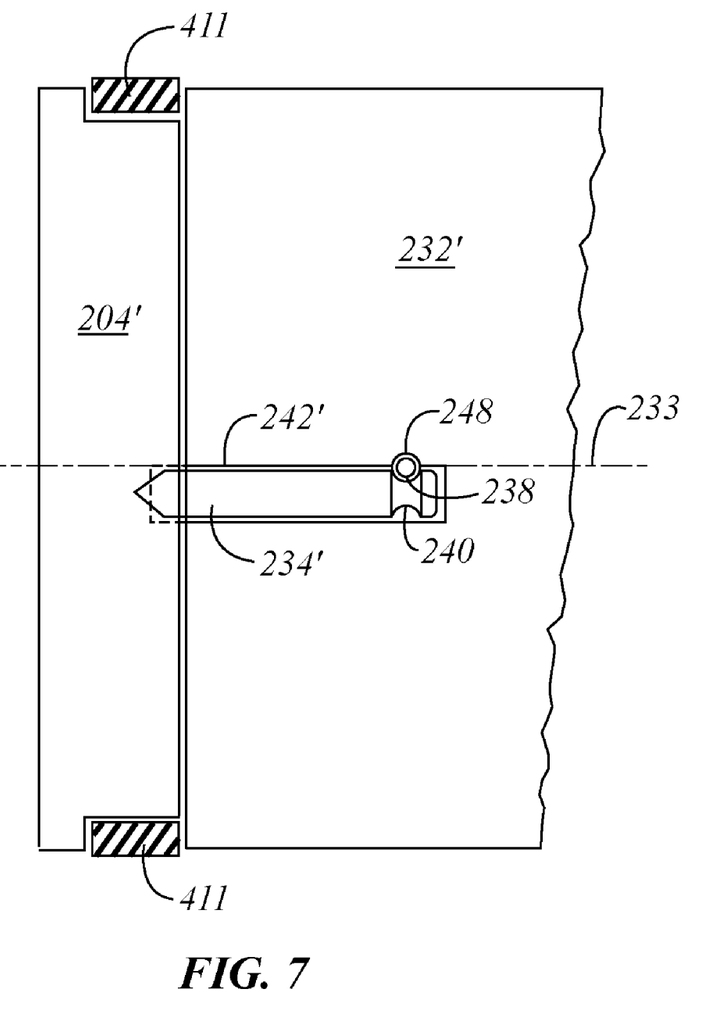
FIG. 7 shows a side cross-section view of a portion of a blowout preventer bonnet assembly in accordance with an embodiment of the present invention.

FIG. 7 shows a side cross-section view of a portion of an exemplary seal earner 204' in accordance with an embodiment of the present invention. The seal carrier 204' is coupled to a load block 232' of a bonnet (201 in FIG. 5). A connecting rod 252 is coupled to the seal carrier 204' (e.g., threaded connection), and it extends into an aperture 242' in the load block 232'. FIG. 7 shows one embodiment of an engagement between a connection rod 252 and a locking pin 238 that is positioned in the load block 232'.

As shown in FIG. 7, the aperture 248 for the locking pin 238 partially intersects the aperture for the connecting rod 252. Thus, when inserted, the upper half of the locking pin 238 engages with the load block 232 of the bonnet (201 in FIG. 5) and the lower half of the locking pin 238 engages with the circumferential groove 240 in the connecting rod 252.

In some embodiments, it may be desirable for the locking pin 238 to be located substantially on the axial centerline 233 of the load block 232', when the locking pin 238 in inserted into the load block 232'. In one embodiment, shown in FIG. 7, the aperture 248 for the locking pin 238 is positioned on the axial centerline 233 of the load block 232'. Thus, the aperture 242' for the connecting rod 252 must be located slightly above or below (below in FIG. 7) the axial centerline 233 of the load block 232'. In this configuration, the locking pin 238 may be inserted at the axial centerline 233 of the load block 232' and engage with both the load block 232' and the connecting rod 252.

When maintenance or inspection of a seal is required, the locking pins (e.g. 238 in FIG. 7) associated with the seal carrier may be removed from the grooves (e.g., 240 in FIG. 7) by pulling them out of the apertures (e.g., 248 in FIG. 7) in the load block 232. Once the connecting rods (e.g., 252 in FIG. 7) are uncoupled from the locking pins, the seal carrier 204 may be removed from the bonnet.

Figure 8:
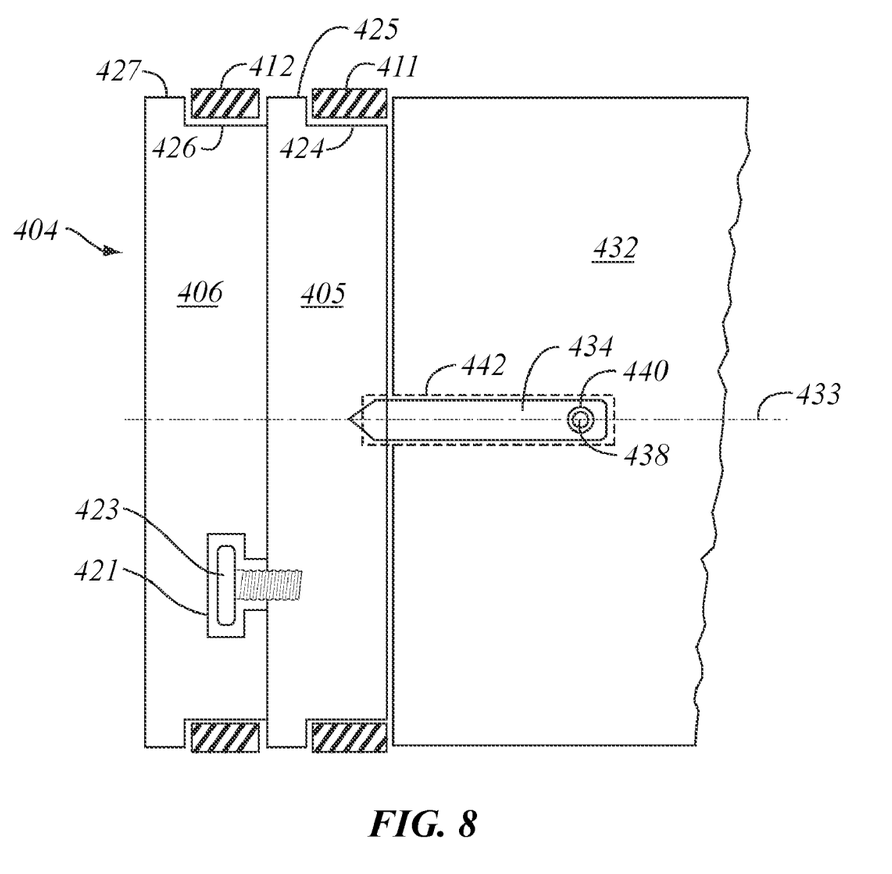
FIG. 8 shows a side cross-section view of a portion of a blowout preventer bonnet assembly in accordance with an embodiment of the present invention.

FIG. 8 shows another exemplary embodiment of a seal carrier 404 in accordance with the present invention. The seal carrier 404 includes two seal plates, a first seal plate 405 and a second seal plate 406. The seal plates 405, 406 are coupled together to form the seal carrier 404.

The first seal plate 405 is coupled to the load block 432 of the bonnet (not shown) with a connection rod 434. A first sealing element 411 is positioned in a recess 424 of the first seal plate 405, and the first sealing element 411 is axially held in place by the load block 432 and a lip 425 of the first seal plate 405.

A second seal plate 406 is coupled to the first seal plate 405 with a seal plate connecting means 423. In the embodiment shown in FIG. 8, the seal plate connection means 423 is a bolt that is coupled to the second seal plate 406 and threaded into the first seal plate 405. In the embodiment shown in FIG. 8, the seal plate connecting means 423 is coupled to the second seal plate 406 by a bolt recess 421 in the second seal plate 406. A seal plate connecting means 423 may be oriented in a opposite direction, so that it is coupled to the first seal plate 405 by a bolt recess and to the second seal plate 406 by a threaded connection. Also, other seal plate connecting means (e.g., clips) may be devised without departing from the scope of the invention.

A second sealing element 412 is positioned in a recess 426 of the second seal plate 406, and the second sealing element 412 is axially held in place by the lip 425 of the first seal plate 405, and a lip 427 on the second seal plate 406.

In the embodiment shown in FIG. 8, the connecting rod 434 includes an aperture 440 in which a locking pin 438 may be positioned. The connecting rod 434 is inserted into an aperture 442 in the load block 432 that is positioned substantially along the axial centerline 433 of the load block 432. The locking pin 438 is inserted into the load block 432 and through the aperture 440 in the connecting rod 434.

As shown in FIG. 8, neither the connecting rod 434 nor the seal plate connecting means 423 penetrated all the way through a seal plate. This arrangement enables the use of connecting rods and seal plate connecting means, without the need for additional sealing mechanisms to seal the penetrations through the seal plates.

Although not shown in cross-sections of FIGS. 7 and 8, it will be understood that a seal plate in accordance with some embodiments will include a center opening (see, e.g., 205 in FIG. 4) and the associated seals.

Those skilled in the art will understand that, in one or more other embodiments of the present invention, the seal plates may be used to mount any number and type of seals. Further, those skilled in the art will understand that additional seal plates may be coupled to the first and second seal plates 405, 406 shown in FIG. 8. The invention is not intended to be limited by the number of seal plates used in any particular embodiment.

Also, those skilled in the art will understand that the embodiment of the present invention shown in FIGS. 7 and 8 are shown without particular bonnet assembly components for purposes of illustrative clarity. For example, it will be understood that a seal plate in accordance with some embodiments will include a center opening (see, e.g., 205 in FIG. 4) and the associated seals so that a ram block actuator piston may move into and out of the bonnet.

Advantages of the present invention may include one or more of the following. In one or more embodiments of the present invention, because a BOP bonnet assembly seal carrier is secured to the bonnet assembly by fastening devices that can be easily removed, the seal carrier is removable from the bonnet assembly, thereby allowing for quick, easy, and efficient seal replacement and/or maintenance.

In or more embodiments, because a seal carrier of a BOP bonnet assembly is fastened in the bonnet assembly by easily removable a small number of fastening devices, the seal carrier may be removed without the need for removing multiple components between the seal carrier and a portion mated to the seal carrier.

In one or more embodiments, because a seal carrier of a BOP bonnet assembly is easily removable, seals for sealing the bonnet assembly to a body of the BOP are not limited to elastomer, or similar, seals. In one or more embodiments, because a seal carrier is easily removable from a bonnet assembly of a BOP, rams may be efficiently replaced and/or maintained.

In one or more embodiments, the invention includes one or more seal plates that do not have any penetrations though the seal plates. Advantageously, these seal plates will not require additional sealing that would accompany the leak paths created by a penetration.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seal carrier for a bonnet assembly of a blowout preventer, comprising:
    a first recess located about a perimeter of the seal carrier;
    a seal for sealing the bonnet assembly to a side opening in a body of the blowout preventer, wherein the seal is at least partially embedded in the first recess; and
    a first connecting rod coupled to and extending from an inner surface of the seal carrier, the first connecting rod having a fastening structure proximal to a distal end of the first connecting rod, wherein the fastening structure is adapted to engage with a first fastening device,
    wherein the seal carrier is removable from the bonnet assembly when the first fastening device is disengaged from the fastening structure.

2. The seal carrier of claim 1, further comprising a second connecting rod coupled to and extending from the inner surface of the seal carrier, the second connecting rod having a fastening structure proximal to a distal end of the second connecting rod, wherein the fastening structure is adapted to engage with a second fastening device, and wherein the seal carrier is removable from the bonnet assembly when the second fastening device is disengaged from the fastening structure.

3. The seal carrier of claim 1, wherein the fastening structure is a circumferential groove.

4. The seal carrier of claim 1, wherein the fastening structure is an aperture.

5. The seal carrier of claim 1, further comprising:
    a center opening configured to allow a ram block actuator piston to move in and out of the bonnet assembly;
    a recessed surface formed in the center opening and adapted to have an inner seal disposed therein for sealing between the ram block actuator piston and the center opening;
    a lip disposed on a side of the recessed surface, wherein the lip is adapted to axially retain the inner seal between the lip and a mating surface when the fastening structure is engaged.

6. The seal carrier of claim 1, further comprising:
    a lip disposed on a side of the first recess, wherein the lip is adapted to axially retain the seal between the lip and a mating surface when the fastening structure is engaged.

7. The seal carrier of claim 6, wherein the seal is not axially retained when the fastening structure is disengaged.

* * * * *